US012617672B2

(12) United States Patent
Jo et al.

(10) Patent No.: US 12,617,672 B2
(45) Date of Patent: May 5, 2026

(54) ON-DEMAND SCALABLE NANO-SCALE 3D PRINTING SYSTEM

(71) Applicant: United States of America as Represented by The Secretary of the Army, Alexandria, VA (US)

(72) Inventors: Kyoo D. Jo, Champaign, IL (US); Sungmin Hong, Champaign, IL (US); Yin Song, Champaign, IL (US); Donald M. Cropek, Seymour, IL (US); Seung J. Oh, Champaign, IL (US); Hyunjung Anna Kim, Champaign, IL (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 53 days.

(21) Appl. No.: 18/313,929

(22) Filed: May 8, 2023

(65) Prior Publication Data

US 2024/0375944 A1     Nov. 14, 2024

(51) Int. Cl.
| | |
|---|---|
| B29C 64/209 | (2017.01) |
| B82B 3/00 | (2006.01) |
| B33Y 10/00 | (2015.01) |
| B33Y 30/00 | (2015.01) |

(52) U.S. Cl.
CPC .......... B82B 3/0004 (2013.01); B29C 64/209 (2017.08); B82B 3/0076 (2013.01); B33Y 10/00 (2014.12); B33Y 30/00 (2014.12)

(58) Field of Classification Search
CPC ........ B29C 64/209; B33Y 10/00; B33Y 30/00
See application file for complete search history.

(56) References Cited

U.S. PATENT DOCUMENTS

| | | | |
|---|---|---|---|
| 11,046,578 B2 * | 6/2021 | Birmingham | ......... B05B 5/0255 |
| 2014/0212641 A1 * | 7/2014 | Choi | ................... B81C 1/00373 |
| | | | 428/206 |
| 2019/0001360 A1 * | 1/2019 | Lefebvre | ................. B05B 5/165 |
| 2021/0138794 A1 * | 5/2021 | Chen | ...................... B41J 2/1433 |

FOREIGN PATENT DOCUMENTS

| | | | |
|---|---|---|---|
| WO | WO2009011709 | * | 1/2009 |
| WO | WO2018148348 | * | 8/2018 |

* cited by examiner

*Primary Examiner* — Edmund H Lee
(74) *Attorney, Agent, or Firm* — Brian C Jones

(57) ABSTRACT

In one embodiment, a 3D printing system includes: a stage on which a substrate is disposed; first and second syringe pumps; first and second syringes; a hydrodynamic flow focusing nozzle having a central channel coupled to the first syringe to receive a printing ink and two side channels on two sides of the central channel and coupled to the second syringe to receive a sheath fluid to pinch the central channel; and a pulse generator to apply an electric potential between the hydrodynamic flow focusing nozzle and the substrate to deposit the printing ink on the substrate on-demand and control ejection frequency of the printing ink. The first syringe pump is controllable to adjust a printing ink flow rate of the printing ink to deposit the printing ink onto the substrate. The second syringe pump is controllable to adjust a sheath fluid flow rate of the sheath fluid.

14 Claims, 13 Drawing Sheets

400

The effect of flow-rate ratio

- Inlet voltage (-1V), outlet voltage (0V)
- Concentration in the middle channel (C=10 mol/m3)
- Flow rate of the middle channel (U=1mm/s)
- Flow rate ratio for the middle and side channel (U/W)
- The inner channel size is 20 um Focused flow width is thinner as U/W is decreasing.

The effect of concentration

- Inlet voltage (-1V), outlet voltage (0V)
- Flow rate of the middle channel (U=1mm/s)
- Flow rate ratio for the middle and side channel (U/W=1:4)

Focused flow width is not a function of Inlet concentration.

The effect of voltage

- Outlet voltage (0V)
- Concentration in the middle channel (10 mol/m3)
- Flow rate of the middle channel (U=1mm/s)
- Flow rate ratio for the middle and side channel (U/W=1:4)

Focused flow width increased when voltage is increased while the velocity remains the same.

(B)

(A)

ON-DEMAND SCALABLE NANO-SCALE 3D PRINTING SYSTEM

STATEMENT OF GOVERNMENT INTEREST

Under paragraph 1 (a) of Executive Order 10096, the conditions under which this invention was made entitle the Government of the United States, as represented by the Secretary of the Army, to an undivided interest therein on any patent granted thereon by the United States. This and related patents are available for licensing to qualified licensees.

BACKGROUND

Field of the Invention

The present invention relates to 3D printing and, more specifically, to nano-scale 3D printing system and method.

Description of the Related Art

This section introduces aspects that may help facilitate a better understanding of the invention. Accordingly, the statements of this section are to be read in this light and are not to be understood as admissions about what is prior art or what is not prior art.

Electrohydrodynamic printing (EHDP) has become a viable high-resolution printing approach for nano-scale manufacturing. The printing resolution, however, is limited by the nozzle orifice dimension causing nozzle clogging.

SUMMARY

The present invention was developed to address the desire for nano-scale 3D printing technology. The research has led to an on-demand scalable nano-scale 3D printing system to create highly controlled and programmable nano and micro-features on surfaces that imbue surfaces with a plethora of novel functionalities (including antimicrobial, camouflage, and total absorption of LASER and Infrared for concealment). Since the smallest droplet size is limited to ~$\frac{1}{15}$ of the nozzle size, nanoscale nozzle fabrication is a main challenge in any nanoscale 3D printing in addition to the clogging due to the narrow nozzle dimension. Electrohydrodynamic printing (EHDP) has become a viable high-resolution printing approach for nano-scale manufacturing. EHDP utilizes an electric potential applied between a nozzle and the substrate. The electric potential causes mobile ions to accumulate near the mouth of the nozzle and due to ionic electrostatic repulsion, the polymer ink deforms into the Taylor cone. When the electrical potential exceeds the surface tension, the Taylor cone is stretched and produces a fine jet or droplet from the cone depending on the electric field strength and the frequency of pulsation. Once the ink droplet is ejected, it is accelerated by the electric field and deposited on the substrate. Owing to rapid vaporization of solvent, periodic accumulation occurs resulting in printing 3D features. Although EHDP is one of the most promising nano 3D printing technologies, the printing resolution is still limited by the nozzle orifice dimension causing nozzle clogging.

Specific embodiments are directed to a 3D nano printing system. The system includes a nanostage set up in a faraday cage and a house-made microfluidic nozzle connected with a LabSmith workstation and syringe pumps. The printing system is used to successfully fabricate four pillars simultaneously by controlling the voltage, frequency, and distance between the nozzle tip and the substrate. 3D reconstruction image is also obtained to measure the height and width of pillars. The average size of pillars is measured to be 5.51±0.31 μm in height and 750±0.71 nm in width. The height and the width can be controlled to nanosize by decreasing the time of deposition and the distance between the nozzle tip and the substrate.

3D nanoprinting technology can be applied to anti-icing, contaminant-free surfaces, remediation and protection against chem/bio warfare agents, maintenance-free long-lasting structures, antimicrobial, camouflage, biosensors, and total absorption of LASER and IR for concealment. End users could print out on-demand scalable nanostructures. Examples of commercial application include airplane wings, nanolithography for IC chip fabrication, corrosion prevention including corrosion-free and contaminant-free materials, building and structures construction, prevention of airborne bacterial diseases, antimicrobial and biowarfare protection, etc. In one example, the technique is used to generate nanosized pillar(s) that will have antifouling activity. In addition, the research includes post-fabricating the surface with antibody that is specific for certain mircoorganisms bringing target-specificity. It led to antimicrobial super surfaces for target-specific bactericidal.

According to an aspect the present invention, a 3D printing system comprises: a substrate; a first syringe pump and a second syringe pump; a first syringe coupled to the first syringe pump and a second syringe coupled to the second syringe pump; a hydrodynamic flow focusing nozzle having a central channel coupled to the first syringe to receive a printing ink and two side channels disposed on two sides of the central channel and coupled to the second syringe to receive a sheath fluid; and a pulse generator to apply an electric potential between the hydrodynamic flow focusing nozzle and the substrate to deposit the printing ink on the substrate on-demand and control ejection frequency of the printing ink from the hydrodynamic flow focusing nozzle. The first syringe pump is controllable to adjust a printing ink flow rate of the printing ink through the first syringe to the central channel of the hydrodynamic flow focusing nozzle to deposit the printing ink onto the substrate. The second syringe pump is controllable to adjust a sheath fluid flow rate of the sheath fluid through the second syringe to the two side channels of the hydrodynamic flow focusing nozzle to pinch the printing ink in the central channel using the sheath fluid flowing through the two side channels.

In some embodiments, the hydrodynamic flow focusing nozzle has a printing ink nozzle surface for contacting the printing ink and the printing ink has a higher dielectric constant than the printing ink nozzle surface. The printing ink nozzle surface of the hydrodynamic flow focusing nozzle may include a gold coating. The printing ink may include at least one of an AuNP solution or gold nanoparticles with controlled sizes in a range of about 3.2-5.2 nm.

In accordance with another aspect of the invention, a 3D printing method comprises: controlling a first syringe pump to adjust a printing ink flow rate of a printing ink through a first syringe to a central channel of a hydrodynamic flow focusing nozzle; controlling a second syringe pump to adjust a sheath fluid flow rate of a sheath fluid through a second syringe to two side channels of the hydrodynamic flow focusing nozzle disposed on two sides of the central channel, to pinch the printing ink in the central channel using the sheath fluid flowing through the two side channels; and applying an electric potential, using a pulse generator, between the hydrodynamic flow focusing nozzle and a substrate to deposit the printing ink on the substrate on-demand and control ejection frequency of the printing ink from the hydrodynamic flow focusing nozzle.

In specific embodiments, the method further comprises controlling the second syringe pump to adjust the sheath fluid flow rate of the sheath fluid and independently controlling the first syringe pump to adjust the printing ink flow rate of the printing ink, so as to control a dimension of the printing ink flowing from the hydrodynamic flow focusing nozzle to the substrate. The method may comprise controlling the sheath fluid flow rate of the sheath fluid flowing through the two side channels to pinch the printing ink in the central channel of the hydrodynamic flow focusing nozzle to a diameter of inner vesicles of about 3-7 nm.

In some embodiments, the method further comprises coating the hydrodynamic flow focusing nozzle to provide a printing ink nozzle surface for contacting the printing ink, and flowing the printing ink through the hydrodynamic flow focusing nozzle, the printing ink having a higher dielectric constant than the printing ink nozzle surface.

In accordance with another aspect of the invention, a 3D printing system comprises: a substrate; a first syringe pump and a second syringe pump; a first syringe coupled to the first syringe pump and a second syringe coupled to the second syringe pump; a hydrodynamic flow focusing nozzle having a central channel coupled to the first syringe to receive a printing ink and two side channels disposed on two sides of the central channel and coupled to the second syringe to receive a sheath fluid; a pulse generator to apply an electric potential between the hydrodynamic flow focusing nozzle and the substrate to deposit the printing ink on the substrate on-demand and control ejection frequency of the printing ink from the hydrodynamic flow focusing nozzle; first means or mechanism for controlling the first syringe pump to adjust a printing ink flow rate of the printing ink through the first syringe to the central channel of the hydrodynamic flow focusing nozzle to deposit the printing ink onto the substrate; and second means or mechanism for controlling the second syringe pump to adjust a sheath fluid flow rate of the sheath fluid through the second syringe to the two side channels of the hydrodynamic flow focusing nozzle to pinch the printing ink in the central channel using the sheath fluid flowing through the two side channels.

In some embodiments, the second means or mechanism comprises means or mechanism for controlling the second syringe pump to adjust the sheath fluid flow rate of the sheath fluid through the second syringe to the two side channels of the hydrodynamic flow focusing nozzle independently of the printing ink flow rate of the printing ink as generated by the first syringe pump, so as to control a dimension of the printing ink flowing from the hydrodynamic flow focusing nozzle to the substrate.

In specific embodiments, the second means or mechanism comprises means or mechanism for controlling the second syringe pump to adjust the sheath fluid flow rate of the sheath fluid flowing through the two side channels to pinch the printing ink in the central channel of the hydrodynamic flow focusing nozzle to a diameter of inner vesicles of less than 10 nm, or about 3-7 nm.

BRIEF DESCRIPTION OF THE DRAWINGS

Embodiments of the invention will become more fully apparent from the following detailed description, the appended claims, and the accompanying drawings in which like reference numerals identify similar or identical elements.

FIG. 10A shows the effect of flow rate ratio (U/W), FIG. 10B shows the effect of concentration of gold nanoparticle solution is simulated, and FIG. 10C shows the effect of voltage.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Embodiments of the present invention utilize EHDP and hydrodynamic flow focusing (HFF) techniques to overcome technical limitations. Current EHDP printing technology is limited by the nozzle orifice dimension. A Hydrodynamic flow focusing (HFF) nozzle is used to achieve the nano-sized ink droplets, using micro-sized nozzle, by pinching the printing ink from sheath flow from side channels. The dimension of ink flow may be controlled by adjusting the printing ink flow rate and the sheath fluid flow rate independently. This nozzle system approaches nanometer dimensions since the droplet diameter will be significantly smaller than the micro-sized nozzle. This 3D nano printing system has the capability to use multiple functional ink materials that have a higher dielectric constant than the surrounding environment from metallic nanoparticles, block copolymers, and to any charged materials.

Smart Biomimetic 3D Printed Bactericidal Surfaces

Figure 1:
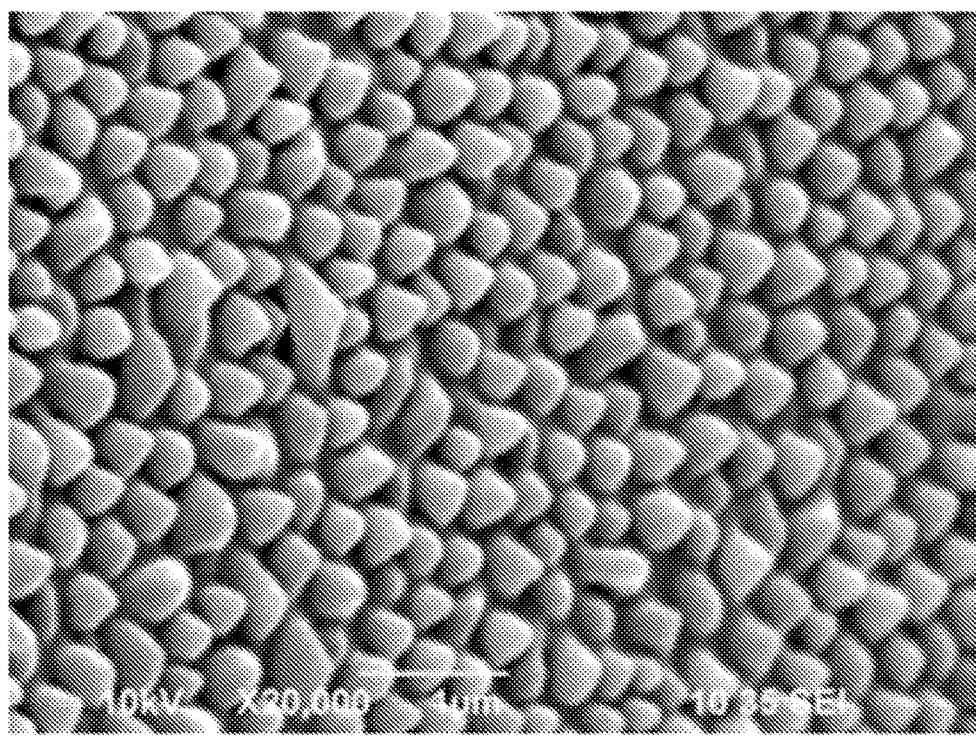
FIG. 1 illustrates an example of nanopillars on the surface of an insect wing.

Many insects have antifouling ability, a self-cleaning ability to prevent any biological agent attachment on their wings to prevent biological contamination. Recent examination of the antifouling ability on the surfaces of insect wings uncovered very effective bactericidal activity that is mediated by nanopillars on the surface. FIG. 1 illustrates an example of nanopillars on the surface of an insect wing. However, the exact mechanism on how the interaction between the nanosurface of insect wings and the cell surface of bacteria contributes to the bactericidal activity was not well understood, due to lack of an easy-to-manipulative nanostructure platform.

The present disclosure is based on research conducted seeking 1) to understand the relationship between geometry of 3D printed nanopillars (uniform vs. non-uniform in height; same vs. different aspect ratio) and bactericidal activity, 2) to understand the effects of materials on bactericidal activity, 3) to determine feasibility of selective bactericidal property through chemical modification, and 4) to determine exact bactericidal mechanism of pseudo dragonfly wings for creating permanent functional surfaces through direct nanoscale additive manufacturing. A nanoscale on-demand 3D additive manufacturing method is feasible based on the following hypotheses: (1) nanopillars with varying height and aspect ratios would kill bacteria more efficiently than a field of uniform nanopillars; (2) adhesion components of bacteria play a critical role in killing bacteria; and (3) 3D printed replicates have the same bactericidal properties as the natural wing surface.

Successful combination of 3D printing nanofabrication to create bactericidal nano surfaces promises to revolutionize the nanotechnology industry (worth $75.8 billion by 2020), since 3D-printing techniques do not require a cleanroom environment, specialized instruments, or expensive antimicrobial surface coating methods (worth $4.19 billion by 2021). In addition, the potential significances are very relevant to multiple emerging and maturing disciplines across the military and the like. This novel 3D printing system demonstrates the fabrication of gold 3D pillars continuously out of streams of gold nanoparticles at rates of hundreds of millimeters per hour with resolutions below 100 microns. The entire fabrication will only take minutes as opposed to hours. This direct on-demand scalable nanoprinting method for rapid 3D printing of nanostructures, with feature resolution of ~100 nm will not only impact industries world-wide, but also impact technologies in the fields such as environmental mitigation of biological warfare agents (e.g., environmental mitigation of bacterial pathogens in water and air), air/water-borne pathogens, and multiple fields in military engineering. 3D additive manufacturing techniques could also be easily outfitted with other properties, including making nano-patterned surfaces which could change optical properties of the surface. Upon success, the present 3D printing technique can be applicable to optical modulation for absorbing and reflecting specific wavelengths of light by changing the periodicity, height/size of nanostructures, to layer by layer deposition of materials with different refractive indices. This technique can further be used for on-demand scalable camouflage and total absorption of visible and infrared wavelengths for total concealment.

Current surface biomimicry is limited by the fabrication processes, such as lithography and deposition, which lack the ability to completely control non-uniform design with nanoscale resolution. 3D printing will offer much more flexibility in terms of the design of the material and will lead to the ability to push boundaries of the nanoscale resolution of surface features. Heretofore, there appears to be no precedent in the fabrication of bio-inspired, nanostructured complex geometries obtained by additive manufacturing. The present technology will lead not only to further understanding of the antimicrobial properties based on the effects of the size, shape, and pattern of the nanofeatures on the killing mechanism of bacteria, but also to the development of a new on-demand and scalable nanofabrication technology.

The present disclosure is based on investigating bactericidal phenomena through the convergence of physical (novel 3D printed smart biomimetic surface with high-aspect-ratio nanopillars) and chemical surface modification techniques. This research leads to understanding the bactericidal mechanism of nanopillars in nature. Furthermore, it is a cornerstone of 3D smart surface manufacturing with highly specific and sensitive bactericidal activity against desired pathogens.

Many insects have antifouling ability, a self-cleaning ability to prevent any microbial attachment on their wings to prevent biological contamination. Recent examination of the antifouling ability on the surfaces of insect wings uncovered very effective bactericidal activity that is mediated by nanopillars on the surface. Nanopillars such as those shown in FIG. 1 (nanostructures with diameter 50-250 nm, height 80-250 nm, and 100-250 nm apart from the center to center of the pillars) play a major role in leading to physical damage of the cell membranes that come into contact with the nanopillars.

Figure 2:
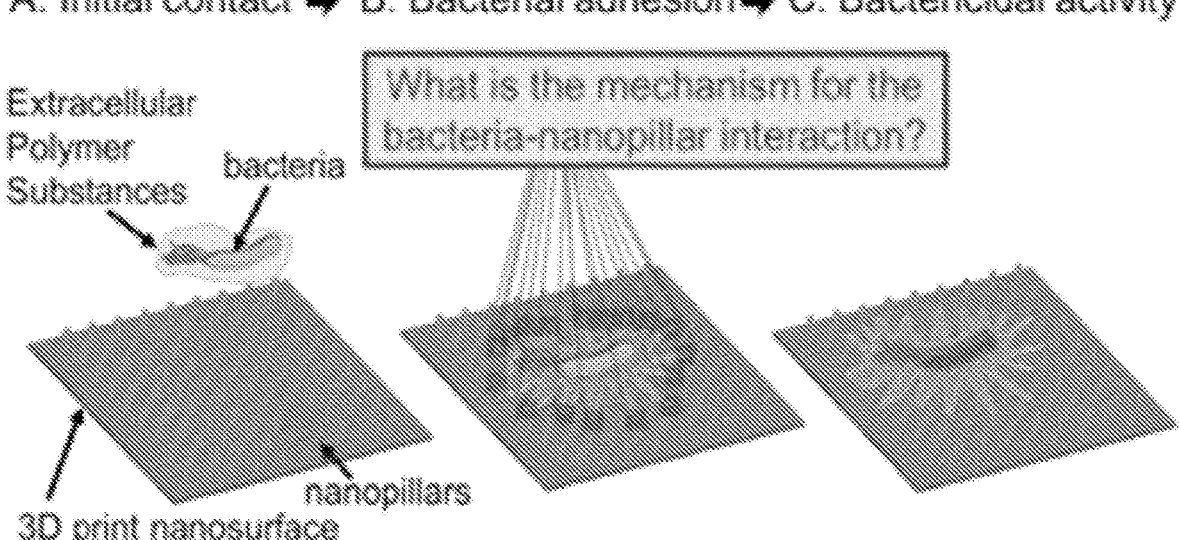
FIG. 2 illustrates two proposed mechanisms to understand bactericidal activity of nanopillars from the studies of both natural nanostructures and bio-inspired nanostructures.

FIG. 2 illustrates two proposed mechanisms to understand bactericidal activity of nanopillars from the studies of both natural nanostructures and bio-inspired nanostructures. The most well-known mechanism on bactericidal activity of nanopillar is the physical poking of nanopillars through the membrane, proposed from the study of cicada insect (*Psaltoda claripennis*) wings. The uniformly distributed nanopillars on the surface of cicada wings (~170 nm apart from the center to center of the pillars, heights of 200 nm, ~60 nm diameter at the top and ~100 nm at the base of the pillar) shows very potent bactericidal activity on human pathogenic Gram-negative bacteria *Pseudomonas aeruginosa*. The mechanism based on biophysical modeling suggests either hydrophobic or hydrophilic nanopillars can physically puncture the cell membrane leading to membrane rupture and is the sole bactericidal contributor.

Another mechanism, however, suggests the strong interaction between bacterial adhesion molecules and nanopillar contributes to the bactericidal activity. Extracellular polysaccharide substances (EPS), a major bacterial adhesion component made with polymer-based molecules, have been shown to be important for the bactericidal activity of dragonfly insect (*Diplacodes bipunctata*) wings. The nanopillars of dragonfly wings of sigmoidal distribution under 90 nm with randomness in size, shape, and spatial distribution, are demonstrated to be effective on killing a variety of bacteria, including both Gram negative bacteria and Gram positive bacteria. The proposed killing mechanism suggests that EPS provides a high affinity towards nanopillar that enhances the immobilization of the bacteria on nanopillar, leading to cell membrane shearing.

The uncertainly of the contribution of these two proposed mechanisms on bactericidal activity of nanopillars suggest further examination of is warranted. 3D printing is an attractive technique to study how the physical aspects of nanopillars can contribute to the bactericidal activity of insect wings in depth. Due to direct writing fabrication, 3D printing technique provides an easy manipulation tool to users. There are several printing techniques that have been developed including fused deposition modeling (FDM), stereolithography (SLA), and selective laser sintering (SLS). Despite the extensive research in nanoscale 3D printing, most printing techniques have limitations in printing resolution (generally >100 μm). However, Electrohydrodynamic printing (EHDP) has become a viable high-resolution printing approach for nano-scale manufacturing.

Figure 3B:
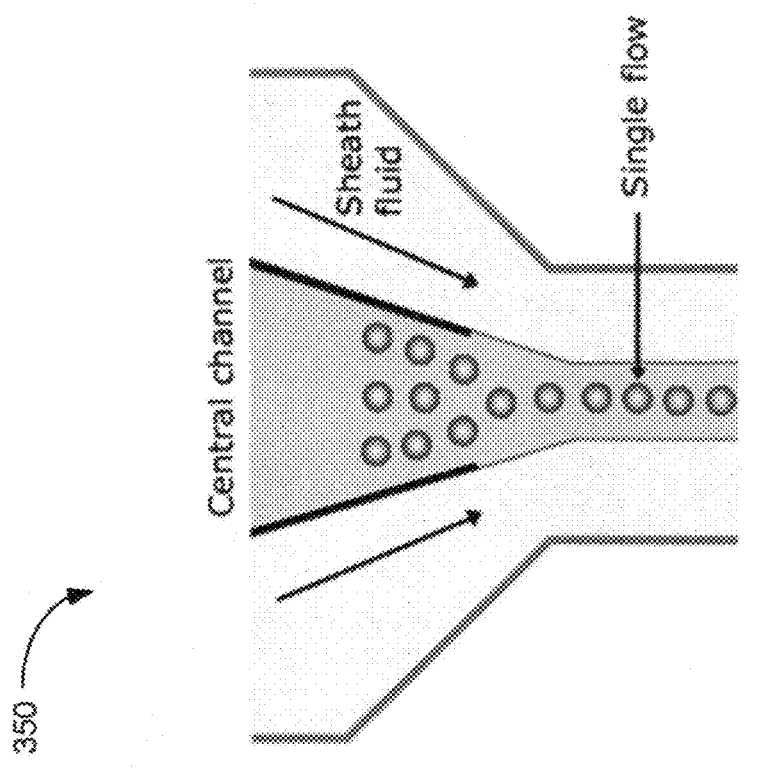
FIG. 3B illustrates an example of a hydrodynamic flow focusing (HFF) nozzle.
Figure 3A:
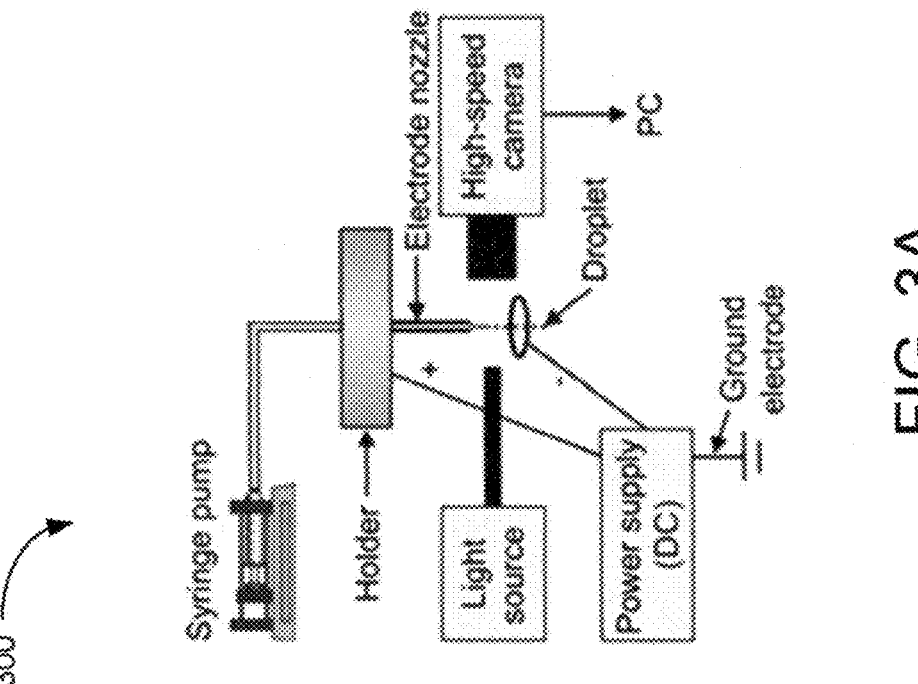
FIG. 3A illustrates an example of an electrohydrodynamic printing (EHDP) system.

FIG. 3A illustrates an example of an electrohydrodynamic printing (EHDP) system 300. It includes a three-axis motorized stage, a high-voltage power supply to trigger and maintain EHDP process, a light source, a high-speed camera or a digital microscope, a solution feeding system, and a substrate. The solution feeding system includes a syringe pump (e.g., New Era Pump System), a syringe (e.g., 5 ml), a flexible hose, a holder, and a stainless steel nozzle with internal diameter (e.g., 0.5 mm).

The working principle of EHDP is based on the conventional electrospinning technique. EHDP utilizes an electric potential applied between the nozzle and the substrate. The electric potential causes mobile ions to accumulate near the mouth of the nozzle and due to ionic electrostatic repulsion, the polymer ink deforms into the Taylor cone. When the electrical potential exceeds the surface tension, the Taylor cone is stretched and produces a fine jet or droplet from the cone depending on the electric field strength and the frequency of pulsation. Once the ink droplet is ejected, it is accelerated by the electric field and deposited on the substrate. Owing to rapid vaporization of solvent, periodic accumulation occurs resulting in printing 3D features. Another advantage of EHDP is the capability to print micro/nano-features with multiple functional ink materials of metallic nanoparticle inks, organic solvents, or solutions of light-emitting small molecules. By using multiple materials, heterogeneous feature printing is enabled. Although EHDP is one of the most promising nano 3D printing technologies, the printing resolution is still limited by the nozzle orifice dimension causing nozzle clogging. Because the smallest droplet size is limited to ~1/15 of the nozzle size, nanoscale nozzle fabrication is a main challenge in any nanoscale 3D printing in addition to the clogging due to the narrow nozzle dimension.

FIG. 3B illustrates an example of a hydrodynamic flow focusing (HFF) nozzle 350. HFF micromixers, in which the central stream is hydrodynamically focused to a narrow jet by two side streams at a cross junction under laminar flow condition, provide a platform for nanomaterial formation. Hydrodynamic focusing reduces the stream width to a few micrometers, even submicrometers, and consequently reduces the diffusion path, where solvent molecules diffuse out and non-solvent molecules diffuse in. Therefore, the time for solvent extraction from its initial solvent/non-solvent ratio to a critical ratio, when nuclei start to be formed and growth, can be greatly shortened by the diffusion based extraction in HFF. Furthermore, the diffusion path can be controlled by the applied pressure or flow rate and thus the speed of the solvent depletion can be varied to offer different stable reaction environments for organic nanoparticle nucleation and growth.

Figure 4:
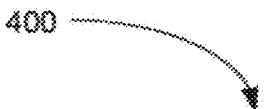
FIG. 4 illustrates an example of a setup utilizing EHDP and HFF techniques to overcome technical limitations.

FIG. 4 illustrates an example of a setup 400 utilizing EHDP and HFF techniques to overcome technical limitations. While EHDP produce a fine jet or droplets from the nozzle using the electrostatic field between nozzle and substrate, a HFF nozzle will help to achieve the nano-sized ink droplets by pinching the printing ink from sheath flow on side channels. The dimension of ink flow will be controlled by adjusting the ink flow rate in the center channel and the sheath solvents flow rate in the side channels, independently. When the electrostatic force (Fe) acting on the droplet surface is large enough to overcome surface tension (Fs), nanodroplets will be ejected from the Taylor cone and printed onto the substrate.

It is expected that the resolution limited by nozzle size will be significantly improved to nanometer dimensions by combining EHDP and HFF techniques since the droplet diameter will be significantly smaller than the micro-sized nozzle. Combining EHDP and HFF techniques, it is best to use the nano/microdripping mode for precise bottom-up construction at the nanoscale. The more ubiquitous cone-jet method restricts the stacking ability of the ink material due to the increase in residual charge accumulation. Instead, the nano/microdripping mode allows for absolute control by printing single dots for precise 3D nanostructures with high aspect ratios. The most important factor when it comes to choosing the printing "ink" material for EHDP is the fact that the material must have a higher dielectric constant than the surrounding environment, thus making EHDP suitable for a variety of materials, such as metallic nanoparticles and block copolymers (BCP). The surrounding environment refers to the material of the nozzle or any other conductive material contained in the environment for manipulating the printing ink material including, for instance, ITO or gold coating on the nozzle. The gold coating is a thin coating of less than 10 nm (e.g., about 5-10 nm). For instance, the ink material including metallic nanoparticles (e.g., gold nanoparticles) and/or BCP has a higher dielectric constant than the ITO or gold coating on the nozzle. The system achieves micro/nano-features with multiple functional ink materials of metallic nanoparticle inks. It results in precisely controlled bottom-up 3D printing in the nanoscale for smart bacterial surface fabrication.

To replicate the nanopillar structure of insect wings, one prints at high resolution and controls the aspect ratios. Using gold nanoparticles as the ink material for pillar construction is ideal. During the printing process, gold-based printing with nanopillar structure causes enhanced local electrostatic field at the extrusion point, leading to autofocusing for the printed materials. This significantly improves the chances of greater resolution that is crucial for nanoscale printing. This model can also be adapted for printing polymers by using solution-based polymers, such as block copolymers (BCP). BCPs have a self-assembly nature with the blocks lining up after the annealing process based on a prepatterned substrate, which allows for better control of the structure of the nanopillars. Along with polymer's ability to be easily functionalized, BCP is another apt material for construction of bactericidal nanopillar surfaces. Currently, using EHDP alone with gold nanoparticles or BCP has insufficient resolution, 50 nm and 100 nm respectively. Therefore, it is imperative to implement HFF to determine droplet resolution by adjusting the ink and sheath flow rates.

The high surface to volume ratio of 3D printed surfaces allows the incorporation of abundant functional ligands, enabling multivalency on gold surface to enhance interactions to target bacteria. Utilizing these characteristic features, gold nanoparticles have been conjugated with known antibiotics to combat multidrug resistant bacteria. The antibiotic molecules can be attached to nanoparticles (NPs) via covalent bonds. The functional ligands on NP surfaces can provide direct multivalent interactions with biological molecules, allowing NPs to be exploited as therapeutic agents. This strategy can circumvent the employment and the potential limitation of existing antibiotics in nanocarrier systems. The structure-activity relationship of the functional ligands on AuNP revealed that AuNP antimicrobial properties could be tailored through surface hydrophobicity, providing a new aspect to design antimicrobial surfaces. This new aspect can be used to design antimicrobial surfaces by understanding the structure/activity relationship of the functional ligands on 3D printed nanopillars.

With easy surface modification of the 3D printed nanostructure as described above, one can examine the functional role of several bacteria attachment molecules for bactericidal activity on the nanosurface. Many reports suggested the adaptability and variability of bacterial attachment strategies utilizing various bacterial adhesion components depends on the characteristics and topography of the surface. Fimbriae is a bacterial adhesion molecule, the component of which has target specificity, found in both Gram negative and positive bacteria. Fimbriae has been shown to be significantly reduced, or shrunken, upon nanotextured metal surface interaction. Yet, no detailed report on the functional role of fimbriae in terms of examining the bactericidal activity of nanopillars has been reported. EPS, as mentioned above, had been widely examined in the field of nanostructure studies. EPS are composed of different charged polymers. While the examination of chemical properties on individual polymers has been reported, their involvement in terms of nanopillar interaction has not been examined. Non-fimbriae, a short monomeric structure involved in nonspecific adhesion, has not been investigated for nanostructure interaction at all. 3D printed nanopillars allow the present inventors to evaluate the importance and involvement of the three bacteria adhesion components for nanopillar interaction, as well as for the bactericidal activity. This establishes the target-specific bacterial killing mechanism through incorporation of specific bacterial attachment strategies.

Understanding the mechanism of bactericidal activity of nanopillar using 3D printing nanosurfaces provides an opportunity to enhance nature's bactericidal activity of nanopillars by incorporating the specific bacterial attachment strategies found in environmental pathogens. The extensive research in adhesion of environmental pathogens reveals specific mechanisms of bacterial attachment for individual pathogens, includes *Salmonella typhimurium, Vibrio cholerae*, as well as *Bacillus anthracis, Yersinia pestis*, both category A biowarfare agent, and *Brucella* spp, a category B biowarfare agent.

The present research seeks to understand the bactericidal mechanisms of natural nanotextured surfaces to impart either selective or universal antimicrobial properties to 3D printed surfaces. Tasks are designed to address the following questions: What are the parameters for high-resolution 3D nanostructures, and can one controllably print and position the nanopillars with desired dimensions? How do geometry and materials of 3D printed nanopillars affect bactericidal activity of the surface? How effectively and selectively do nano-engineered surfaces kill the bacteria compared with dragonfly wings?

Task 1. Nanoscale Additive Manufacturing

Subtask 1.1 Nozzle fabrication and 3D printer system setup. 1 μm diameter channels are fabricated using Electron-beam (e-beam) lithography on a silicon wafer. After fabrication, the nozzle is coated with gold using e-beam evaporator. Piezoelectric actuators are used to control ink flow and sheath flow. The printing ink material from Task 2 feeds into the center channel and solvent (e.g., acetone) is used as sheath streams to generate HFF and narrow the ink stream in the range of nanometers.

Figure 5:
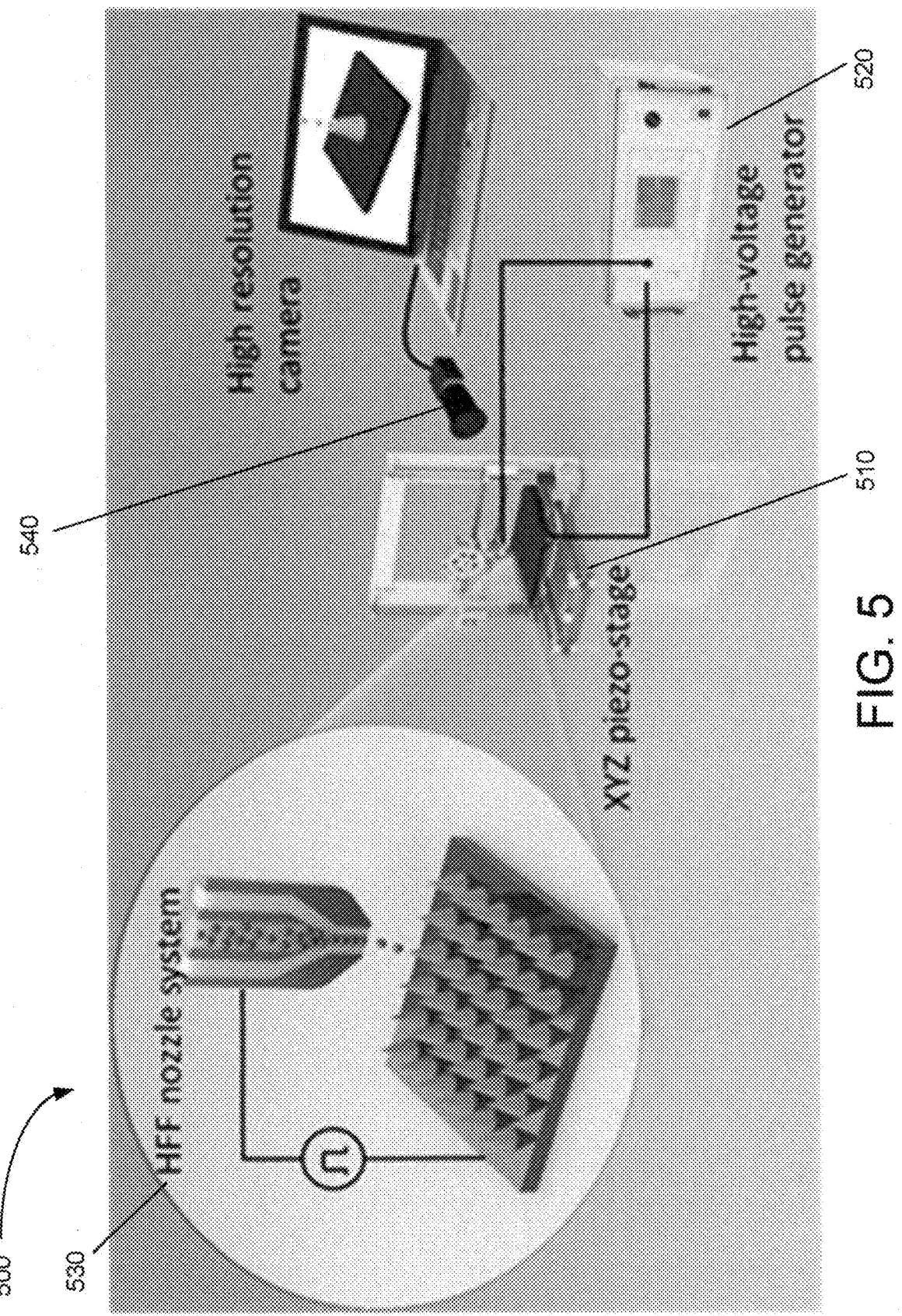
FIG. 5 illustrates an example of a 3D printing system according to an embodiment.

FIG. 5 illustrates an example of a 3D printing system according to an embodiment. The 3D printing system 500 includes a 3D piezo-stage 510, a high-voltage pulse generator 520, a HFF nozzle system 530, and a high-resolution camera 540. An Indium Tin Oxide (ITO) coated glass plate may be mounted at the piezo stage to position the substrate with nanometer accuracy (<10 nm). The high-voltage pulse generator 520 operates at a voltage to produce the necessary electrical potential between the nozzle and the substrate to produce the nano ink droplet. The operation voltage may be about ±200 to 400 V (e.g., ±10%). The ITO glass plate provides a conductive surface for precise deposition of nanoparticles and heating for rapid evaporation of residual solvents. A high-voltage pulse generator provides drop-on-demand capabilities and controls ejection frequency. The fine droplets can be deposited and solidified on demand to form 3D features layer-by-layer. A high-resolution camera may be used to monitor the printing process.

The system includes a piezoelectric actuators and a syringe pump to control ink flow and sheath flow, an XYZ piezo stage to move the substrate with nanometer accuracy (<10 nm), a high-resolution camera to monitor the real-time 3D printing process, and a high voltage pulse generator to apply an electric potential between the nozzle and the substrate, and also to accelerate the nm droplet to the substrate.

Subtask 1.2 Study on effects of process parameters on high-resolution 3D printing. The 3D printing system is a two-step process. First, a HFF method utilizes microfluidic hydrodynamic focusing to precisely control the convective-diffusive mixing and obtain nanosize ink droplet. In the setup shown in FIG. 4, a central stream (gold nanoparticles) is brought into contact with two side streams (solvent) from the side channels. The side streams spatially constrain the central stream into a thin thread as they pass through the mixing orifice. In the orifice, the central stream expands laterally until the break-up of this flow into a spherical droplet with gold nanoparticles inside. After break-up, the central stream retracts to the tip of the center channel and successive cycles of gold nanoparticles encapsulated ink droplet production are repeated.

Figure 6:
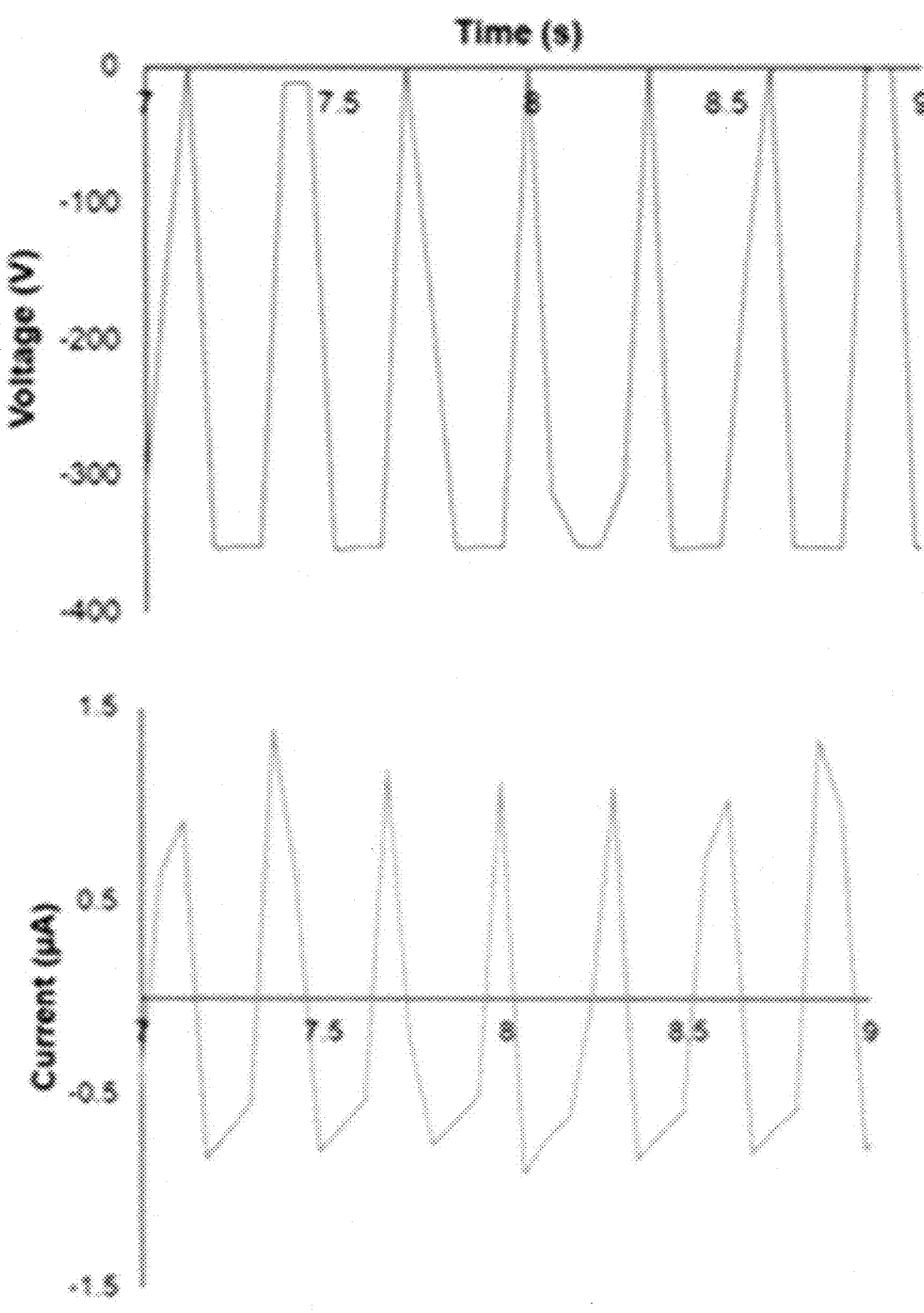
FIG. 6 shows the voltage and current for gold nanoparticle deposition during printing.

FIG. 6 shows the voltage and current for gold nanoparticle deposition during printing. Upon application of the printing voltage with 5 Hz, nano-spray is observed. The droplet vibrates with the same frequency and continuously extrudes AuNPs based ink.

The diameter of the inner vesicles is expected to be 3-7 nm. In order to control the vesicle sizes by this shear-focusing droplet generation process, both structural parameters (design of microfluidics, dimension of channel) and operational parameters (viscosities of the two fluids, their interfacial tension, and the ratio of flow rates) are evaluated. Next, in order to control the 3D printing process, two key parameters in EHDP system, the ink flow rate and voltage, are tuned. These two parameters correlate strongly with the ink droplet travel velocity and volume, which determine the final 3D nanofeatures. A "cone jet—a continuous stream of liquid" mode is used to print microscale features and "nanodripping" mode is used for nanoscale features. When the flow rate and electrical field are properly matched, "cone jet" mode will be achieved. However, if the flow rate is smaller or electrical field strength is higher, the printing mode will be changed to "nanodripping" mode. By controlling the flow rate and electrical field strength, the printing capability can be adjusted in the range from nanometers to micrometers. The 3D printed surface can be imaged in real-time and immediately after the two-step process using high-speed/ resolution camera and scanning electron microscope (SEM).

The HFF results include obtaining the nm scale range in the focusing ink flow. The HFF in Micro scale showed ~30 fold decrease in flow width.

Subtask 1.3 Modeling of HFF and EHDP process. Numerical simulations of HFF process can provide the fundamentals of mass transfer and fluid flow, which determine the size of nanoscale droplet ink. Under laminar fluid flow, the mixing of the liquids is governed by molecular diffusion and convection, which defines the solvent stream and gold nanoparticle stream interface. A single-phase fluid model, with continuous shear stress and velocity (middle stream) across the interface in the microchannel, is simulated. Concentration distributions of a gold nanoparticle stream sheathed by two adjacent solvent streams are investigated with a two-dimensional model by COMSOL Multiphysics. The research provides the concentration gradient profiles of mixtures under various hydrodynamic focusing conditions including total flow rate, flow rate ratio, and viscous anisotropy. Microfluidic device size and geometry determine solid-liquid boundary conditions of the Navier-Stokes equations, which influence the relative amount of rapid convective-diffusive mixing in the hydrodynamic focusing region and slow diffusive mixing through the interfaces. In the EHDP system, as the voltage is gradually increased, the Taylor cone is gradually forming at the tip of the nozzle. The size of the droplets is affected by a balance of electric and surface tension, which can be simulated by COMSOL AC/DC electrostatics module. When the electrostatic force (Fe) acting on the droplet surface is large enough to overcome surface tension (Fs), nanodroplets will be ejected from the Taylor cone and printed onto the substrate as shown in FIG. 4. To precisely control droplet size, the effect of the electrostatic force as a function of surface tension may be calculated from the simulation. To estimate the droplet diameter, the following balance of surface tension and electric forces has to be fulfilled. The electrostatic force, Fe, can be expressed as a function of the applied voltage (V), droplet diameter ($D_d$), and the nozzle/meniscus diameter ($D_N$), as $$F_e = cV^{k1}D_d^{k2}D_N^{k3}$$

where k is Coulomb's constant. The surface tension force, $F_s$, can be expressed as $F_s = \sigma\pi D_d$, where $\sigma$ is surface tension coefficient. A surface plot of the obtained electric field may be investigated and input voltages may be adjusted until the resulting electric force matches the surface tension force.

Task 2. Nanopillar Construction and Modification.

Subtask 2.1 Different Materials. A solution based 3D nano/microdripping mode for EHDP is used while maintaining precise nanodimensional control. Gold nanoparticles may be the primary printing ink material. To have complete control of the surface functionality and the size, the gold nanoparticles are synthesized in house. The synthesis technique may be based on a process that produces stable, naked gold nanoparticles by using highly acidic and basic stock solutions of the precursors, while producing monodisperse sized particles. First, one stabilizes gold chloride in a hydrochloric acid solution for a long period of time. Then, one makes a stock solution of borohydride anions by dissolving sodium borohydride in a sodium hydroxide based solution. Then the gold chloride anion solution will be injected into water along with the borohydride anion solution. Based on the ratio of the two solutions, one may produce monodisperse population of gold nanoparticles with controlled sizes in a range of about 3.2-5.2 nm (e.g., ±10%). The nanoparticles are characterized in size and shape using transmission electron microscopy. For EHDP, one may suspend the gold nanoparticles in cyclododecene and diluted in n-tetradecane (0.1 vol %) and feed into the instrument as stated in Subtask 1.1. To avoid clogging of our system, it is imperative to dilute the nanoparticles. Due to the complex electrohydrodynamic mechanism behind the additive manufacturing process, one seeks to determine how size and surface functionality of the nanoparticles influences the resolution of the printing. To determine our EHDP/HFF method's versatility in printing materials, one may also try to print nanostructures using a BCP, polystyrene-polymethyl methacrylate (PS-PMMA). This method uses a topographically prepatterned surface with hydroxyl-terminated, random copolymer brushes spin cast onto a substrate with a hydrogen silsesquioxane layer. To avoid similar clogging issues with nanoparticles, one may dilute PS-PMMA into 1,2,4-trichlorobenzene as the printing ink. The polymer's chemical structure allows for easy modification to help one understand how the material's functionality plays a role in bactericidal capabilities as proposed in Task 3. Despite the polymer's limited electrical conductivity compared to gold nanoparticles, one expects to be able to print the BCP with nanoprecision control using EHDP/HFF with the assistance from the prepatterned surface.

Subtask 2.2. Same/Different Aspect Ratio. To better understand the bactericidal mechanism of nanopillars, one may try to replicate the surface structures of cicada and dragonfly wings. The cicada wing is patterned with pillars, all with the same dimensions. The goal is to replicate the same pillar structure with 200 nm height and 100 nm diameter base and 60 nm diameter top. This structure may be produced by precise control of the ink and sheath flow rates that have distinct gradients to model the cone-like structure. One may also try to 3D print samples with pillars of varying aspect ratios. This most closely resembles a dragonfly wing structure, which is known to kill a wider range of bacteria than the cicada wing. This exploits the benefits of using an additive manufacturing system, by having each pillar have unique aspect ratios. Comparing samples with same aspect ratio pillars and varying aspect ratios will help one understand the antibacterial mechanism.

Subtask 2.3 Chemical surface modification. The proposed mechanism based on biophysical modeling suggests that the physical feature of nanopillars is the sole factor that contributes to the bacteria killing, whether hydrophobic or hydrophilic, the increasing surface interaction after bacterial adhesion on the nanopillars eventually overcomes the cell membrane rigidity, leading to the cell membrane rupture. Tuning of the functional groups on the gold nanopillars provides the surface that is effective to kill both Gram-negative and Gram-positive bacteria. Gold nanopillar surfaces with cationic surface properties may be used as antimicrobial agents causing bacterial membrane damage. The antimicrobial properties will be tailored through surface physical properties. To systematically investigate the role of surface chemistry in gold nanopillar surface antimicrobial efficacy, the 3D printed surfaces may be immobilized with a range of different self-assembled monolayers (SAMs) of alkyl-head poly(ethylene glycol) PEG derivatives. These ligands have a flexible hydrophilic PEG region with hydrophobic alkyl chains, which can possess either or both hydrophilic and hydrophobic properties. Different alkyl-head PEG derivatives may be immobilized on gold nanopillar surface via a surface exchange reaction as flexible molecules responsive to bacteria. The water contact angels for each PEG-derivative SAM modification are examined. The effect of alkyl chain length in PEG on hydrophobicity of gold nanopillar is investigated. In order to provide antimicrobial selectivity for the 3D printed surfaces, the gold nanopillar is functionalized for conjugation of specific labeling peptide or antibody against certain bacteria. Covalent linkers may be used to bind functionalized groups to gold nanopillar surface, which can directly conjugate with thiol group-containing biomolecules such as antibodies. Briefly, a heterobifunctional linker, hydrazide-polyethylene glycol-dithiol, may be used to directionally attach the nonbinding region of the antibody to the gold nanopillar surface. This conjugation method allows one to immobilize various glycosylated antibodies onto a single nanopillar.

Task 3. Bactericidal Activity of 3D Printed Nanopillar

Subtask 3.1. Understanding the bactericidal mechanism of insect wings. To test the bacterial killing mechanism of insect wings, the bactericidal efficiency is measured using the fabricated 3D nanosurfaces from Task 2, using Gram-negative *Pseudomonas aeruginosa* and Gram-positive *Staphylococcus aureus* as model organisms. For quantitative measurements of bactericidal activity, counting colony-forming unit (CFU) after the bacteria incubation on the nanosurface may be applied. For qualitative measurements, electron microscope techniques after the bacteria incubation on the nanosurface may be applied. Fluorescent labeling on live/dead cells can further facilitate the cell death measurements. After the staining, the fluorescent microscopy can be used to obtain fluorescent images. FilmTracer™, a commercial kit to stain extracellular polysaccharides (EPS), may be utilized to visualize EPS of bacteria. One may visualize other bacterial adhesion molecules by antibody staining. Since several mutations are available that affect the adhesion molecule, through purchasing and material requests, of both Gram-negative *P. aeruginosa* and Gram-positive *S. aureus*, the importance of bacterial adhesion molecules for bactericidal activity will be examined in the same manner.

Subtask 3.2 Target-specific bactericidal 3D printed nanosurface The antibody attached 3D printed nanosurface from Task 2 is utilized to explore the possibility of generating a target-specific bactericidal 3D nanosurface applicable to either killing or mitigation of both environmental pathogens and bio-warfare agents. The specific bactericidal activity of antibody-linked 3D printed surface is evaluated for environmental pathogens, *Salmonella typhimurium* and *Vibrio cholerae*. In addition, biowarfare agents may be evaluated, which includes *Yersinia pestis*, both category A biowarfare agent, and *Brucella* spp, a category B biowarfare agent. These organisms can be cultured and tested. Many bacteria specific adhesion molecules and cell surface proteins have been discovered in both environmental pathogens and bio-warfare agents. One may covalently link FimA antibody for *Salmonella typhimurium*, TCP and MSHA for *Vibrio cholerae*, BsIA for *B. anthracis*, Pla for *Yersinia pestis*, and BmaC for *Brucella* spp, on 3D nanosurfaces, and measure the bactericidal activity of the antibody-conjugated 3D printed nanosurface.

3D Nanoprinting System

Figure 7:
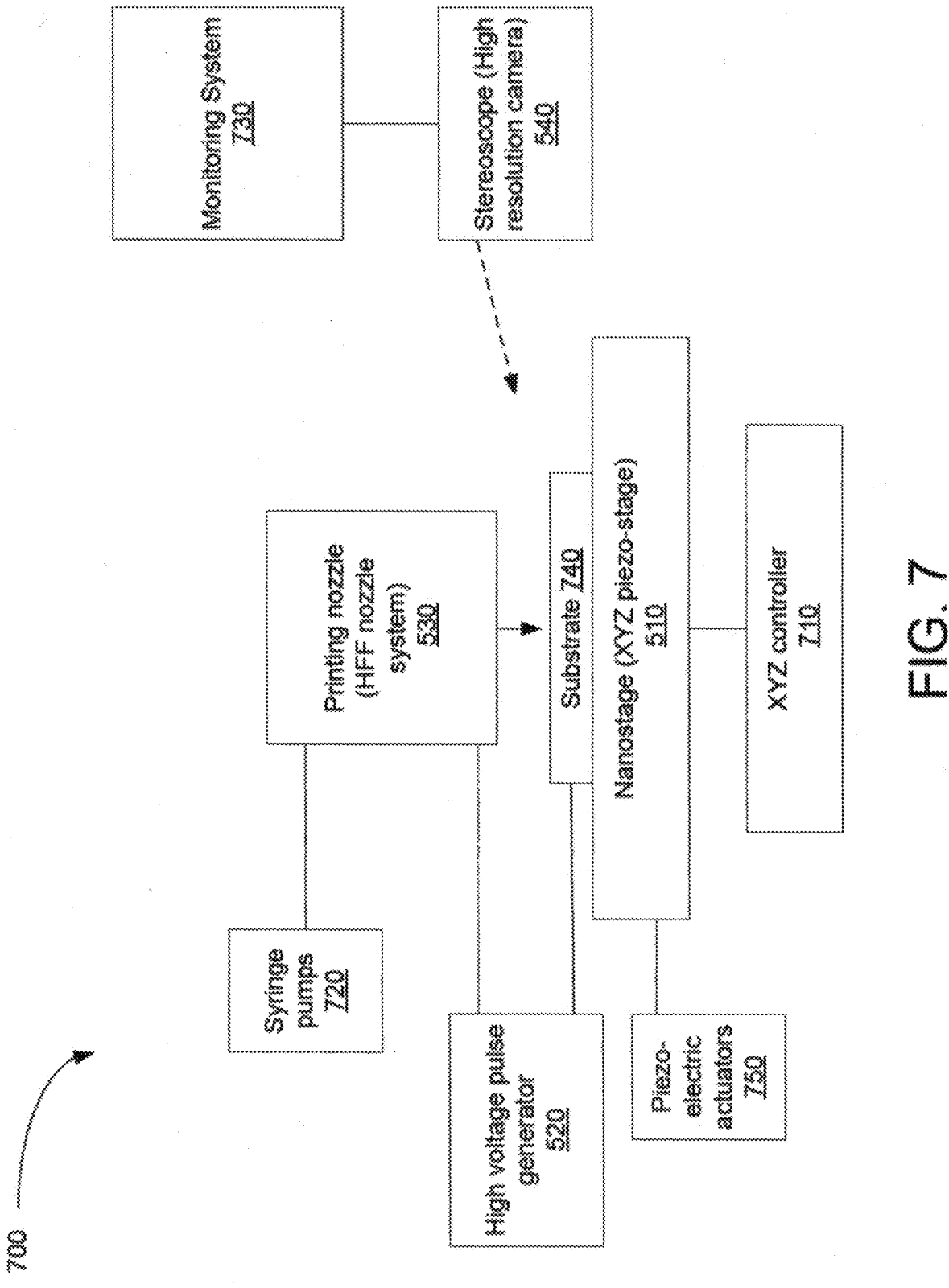
FIG. 7 is a block diagram schematically illustrating an example of a 3D nanoprinting system.

FIG. 7 is a block diagram schematically illustrating an example of a 3D nanoprinting system. The system 700 includes a nanostage (XYZ piezo-stage 510) controlled by an XYZ controller 710, syringe pumps 720 connected to a printing nozzle (HFF nozzle system 530), a stereoscope (high-resolution camera 540), and a monitoring system 730. Piezoelectric actuators 750 can be used to control the nanostage 510. The syringe pumps 720 can be manually controlled to adjust fluid flow rates.

The syringe pumps are used to control ink flow and sheath flow. The XYZ piezo stage 510 is used to move and position a substrate 740 with nanometer accuracy (<10 nm). An Indium Tin Oxide (ITO) coated glass plate may be mounted at the piezo stage 510 to position the substrate 740 with nanometer accuracy (<10 nm). The ITO glass plate provides a conductive surface for precise deposition of nanoparticles and heating for rapid evaporation of residual solvents. The high voltage pulse generator 520 is used to apply an electric potential between the printing nozzle 530 and the substrate 740 and also to accelerate the nm droplet to the substrate. The high-voltage pulse generator 520 provides drop-on-demand capabilities and controls ejection frequency. The fine droplets can be deposited and solidified on demand to form 3D features layer-by-layer. The high-resolution camera 540 is used to monitor the real-time 3D printing process.

The 3D printing system 700 at the nanoscale level combines electrohydrodynamic printing (EHDP) and hydrodynamic flow focusing (HFF) for on-demand 3D printing. It can generate micro/nano features with multiple functional metallic nanoparticle ink materials. It also can precisely print 3D micro/nanostructures with high aspect ratios. The research described above has successfully demonstrated 3D printing of nanostructures. The end user can print out on-demand nanostructures for contaminant-free materials with concealment capability. It is an ultra-high-resolution printing approach for nanoscale additive manufacturing.

The nanostage is placed on the XYZ-controller which enables the nm scale movement. Then, the nanostage is used to precisely control the distance (z-position) between the nozzle and the substrate on the nanostage. Two syringe pumps supply the AuNP solution flow and the sheath solvents flow, respectively, to the nozzle. Once the droplet is formed at the end of nozzle, a high voltage sequencer (e.g., LabSmith) is used to produce the desired voltage waveform. The printing process may be monitored using the stereoscope. The system 700 includes electronics to provide complex drive waveforms to microdispensing devices and software to control the drive electronic units.

To fabricate the nanopillars, voltage −350 V at 200 ms (5 Hz) intervals is applied. Upon the voltage applied, the droplet oscillates corresponding to the applied voltage and forms the jet streams to the substrate. During this process, the AuNPs are deposited on the substrate and build up the pillar structures.

While the current version is a lab-scale single nozzle deposition system, one envisions the potential to create multiple jet streams to the substrate using a multitude of nozzles, pores, or other injection ports that can build multiple features simultaneously, with each deposition individually addressable for maximum control over all surface features.

The 3D nano printing system 700 utilizes an electric potential applied between the nozzle and the substrate. The electric potential causes mobile ions to accumulate near the mouth of the nozzle and due to ionic electrostatic repulsion, solution ejection occurs. The novel printing nozzle that utilizes EHDP and HFF techniques. This nozzle achieves the nano-sized ink droplets by pinching the printing ink from sheath fluid flow on side channels. The dimension of ink flow is controlled by adjusting the ink flow rate and the sheath fluid flow rate independently. The system 700 may be operated at the operation voltage: ±200 to 400 V, frequency: 3 to 5 Hz, and printing material: any charged materials. The dispensing devices are suited for dispensing droplets of aqueous and solvent-based fluids at up to about 50° C.

The piezo nanopositioning system is constructed for movement of 3D nanoprinting. It is integrated with coarse positioning stages and standard optical accessories. Internal position sensors combine with a closed loop controller to provide repeatable and stable position measurement. Independent flexure guided motion by a wireless joystick for each axis provides mechanical isolation and ensures that alignment adjustments can be done with minimum crosstalk. It may have 200 μm three axis motion (XYZ), closed loop control, true flexure guided motion, resolution of 1 nm, resonant frequency at 150 Hz, stiffness of 1 N/μm, a maximum horizontal load of 0.5 kg, and a maximum vertical load of 0.2 kg.

Specialized Nozzle for 3D Nanoprinting

Since the smallest droplet size is limited to ~1/15 of the nozzle size, nanoscale nozzle fabrication is a main challenge in any nanoscale 3D printing in addition to the clogging due to the narrow nozzle dimension.

As described above in connection with FIGS. 3B to 5, the present nanoprinting system utilizes a specialized nozzle for 3D nanoprinting having two outlets: one for EHDP and the other for HFF for further pinching the printing ink. It may be a microfluidic channel having a width of about 40-60 μm (e.g., ±10%), or about 50 μm (e.g., ±10%). The hydrodynamic flow focusing nozzle may be made with ITO coated glass and PDMS microfluidic channel. It is connected to the dispensing device and the syringe pump. The nozzle may be fabricated using microfabrication. It is possible to customize the dimensions based on different requirements. Examples of such requirements include types of printing inks, dimensions of the printed features, and scalability.

Figures 8, 9:
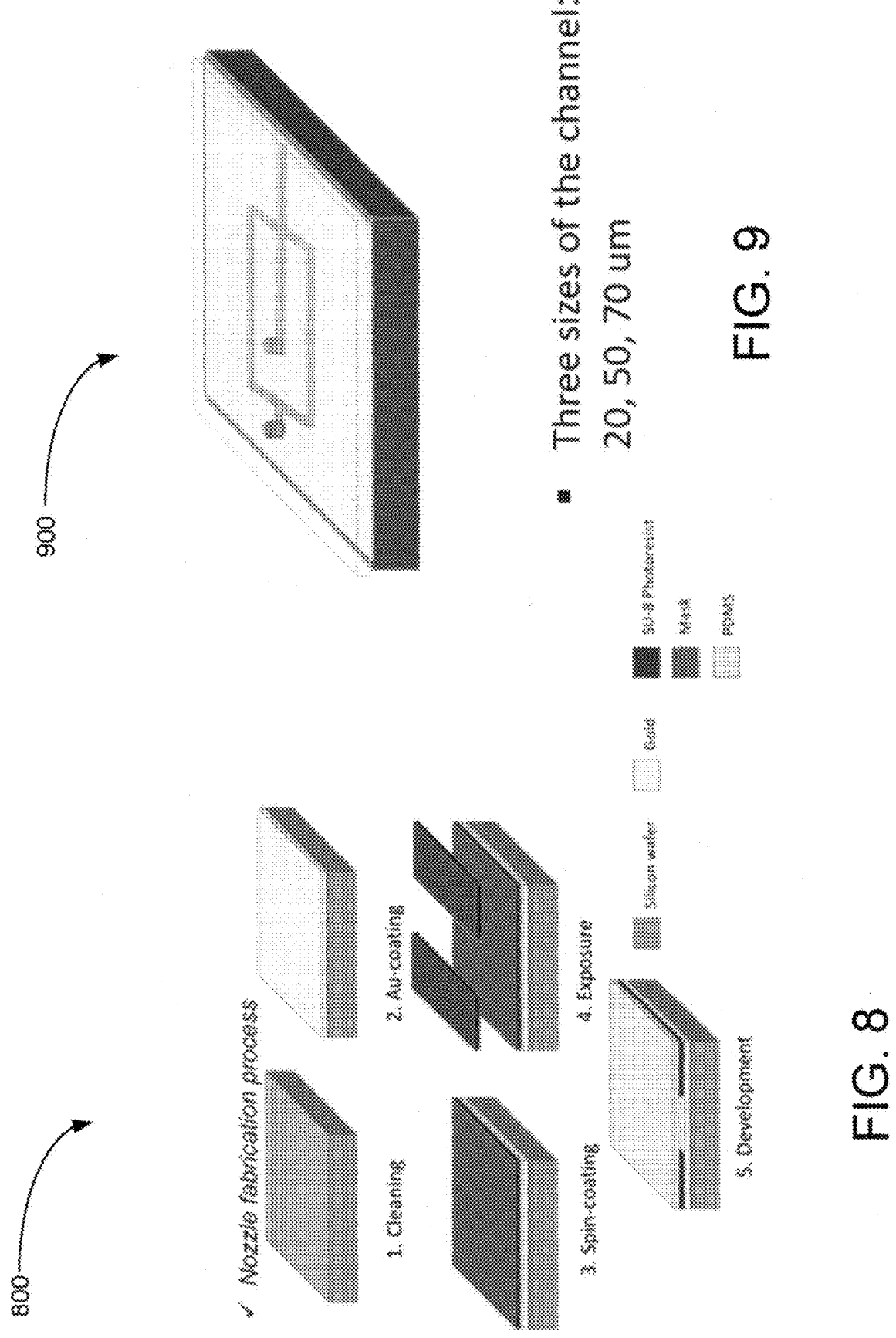
FIG. 8 illustrates an example of a nozzle fabrication process.
FIG. 9 illustrates an example of a fabricated nozzle having microfluidic channels of different sizes.

FIG. 8 illustrates an example of a nozzle fabrication process 800. After (1) cleaning, a silicon wafer such as a bottom glass layer is (2) coated with gold (e.g., by E-beam). The layer is (3) spin-coated with a photoresist (e.g., SU-8). Microfluidic channels, including a central channel for an ink flow and two side channels for sheath fluid flow, are designed and fabricated using the SU-8 photoresist. This may be accomplished by (4) exposure using a mask. A top PDMS layer is formed in a (5) development step to contain the microfluidic and is bonded onto the gold coated silicon wafer by, for instance, oxygen plasma treatment.

FIG. 9 illustrates an example of a fabricated nozzle 900 having microfluidic channels of different sizes (e.g., 20, 50, and 70 μm).

Figure 10A:
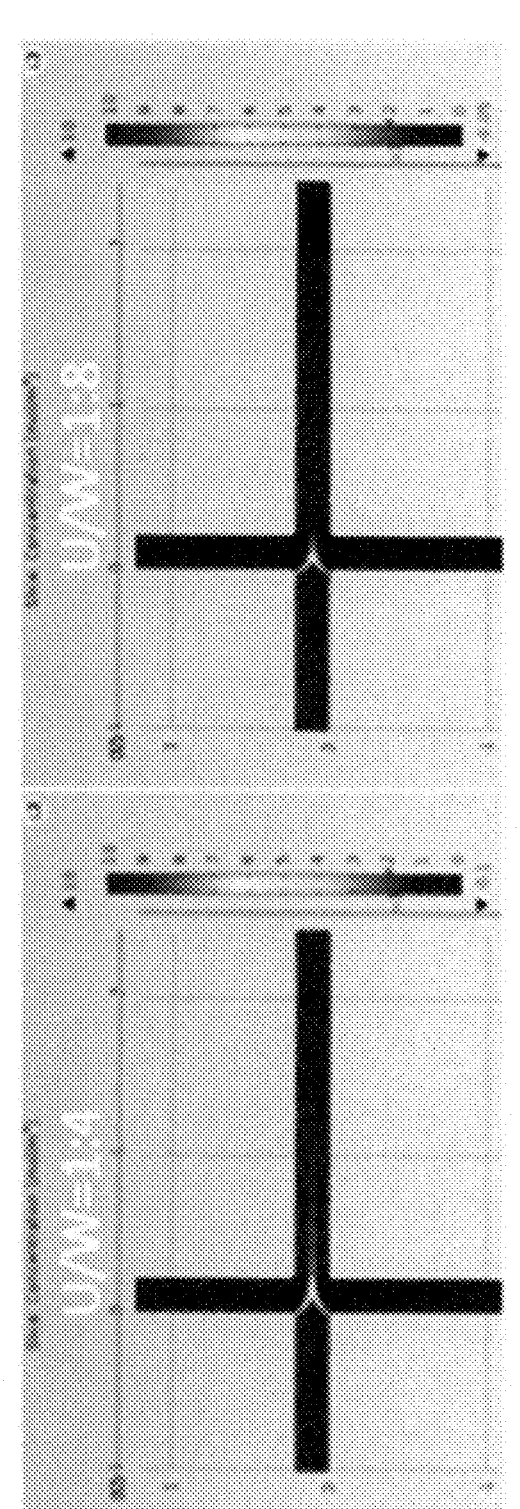
FIGS. 10A-10C illustrate an example of modeling of HFF and EHDP using Microfluidics Module and AC/DC Module from COMSOL Multiphysics. Based on the simulation.
Figure 10B:
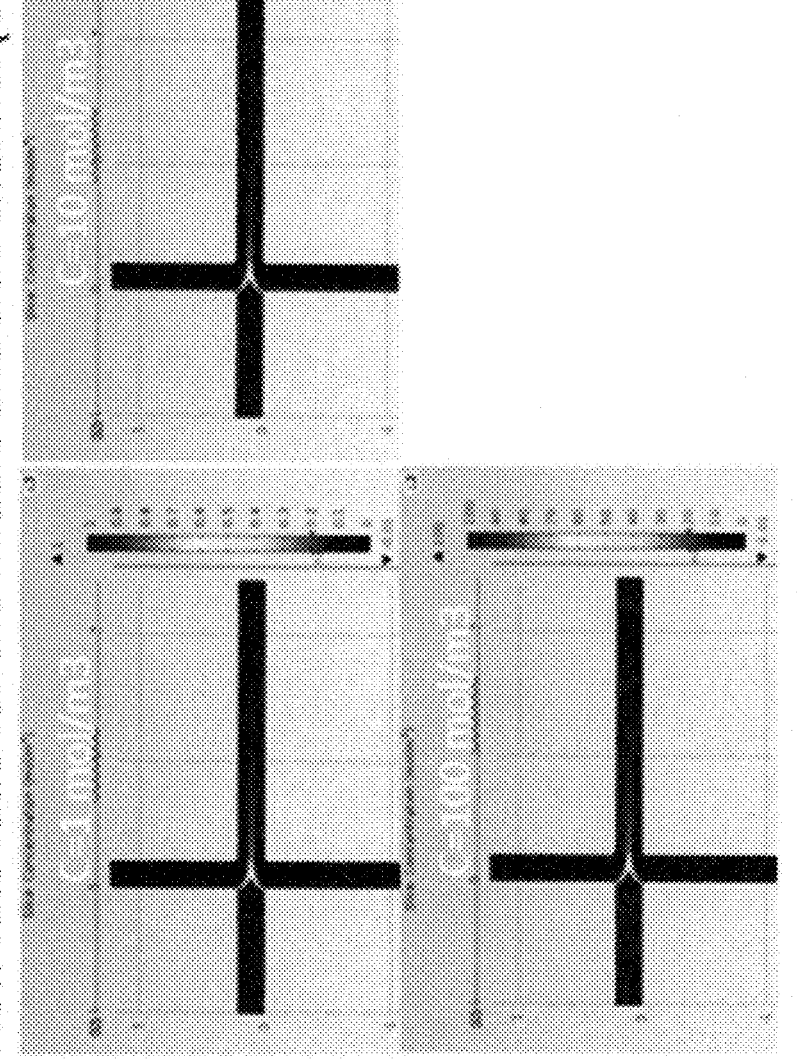
Figure 10C:
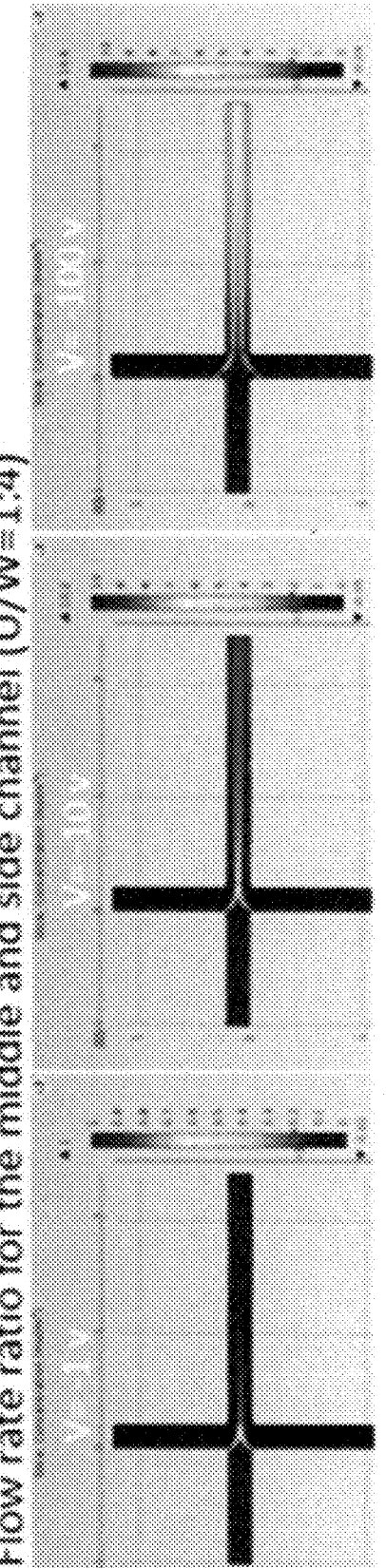

FIGS. 10A-10C illustrate an example of modeling of HFF and EHDP using Microfluidics Module and AC/DC Module from COMSOL Multiphysics. The figures show a 2D cross section of the geometry in the XZ-plane having a cross pattern with two horizontal channels (right and left) and two vertical channels (upper and lower). The horizontal channel on the right serves as a focusing channel and horizontal channel on the left is an injection channel for gold nanoparticles. The two vertical channels are injection channels for water. During the focusing process, the device injects water through pressure-driven convection into the vertical channels. At the same time, it forces the gold nanoparticle solution through the horizontal channel. A horizontal electric field is also applied to control the focusing flow width and flow rate. Several equations describe the model: The Stokes flow equations give the current mass a momentum balance in the focusing stage while a mass balance using the Nernst-Planck equation. For the pressure-driven flow, it is assumed that the flow has fully developed laminar form in all inlets, that all sides have no slip conditions, and that the fluid flows freely out from the end of the focusing channel.

Several parameters are considered in this simulation of the 3D printing system with the fabricated nozzle, including the inlet voltage in the horizontal channel on the right side (V1), the outlet voltage in the horizontal channel on the left side (V2), the concentration in the middle channel containing gold nanoparticle solution (C), the flow rate of the middle channel containing gold nanoparticle solution (U), the flow rate of two side channels containing water (W), and the flow rate ratio (U/W).

In FIG. 10A, the effect of flow rate ratio (U/W) is simulated to study the focused flow width change for gold nanoparticle solution as it passes through the horizontal focusing channel. V1 is set at −1 V and V2 is set at 0 V. C is 10 mol/m³ and U is 1 mm/s. Only the flow rate ratios U/W are varied from 1:4 to 1:8. The simulation results show that as the U/W decreases, the focused flow width for gold nanoparticle solution gets thinner, which indicates better resolution of the ink.

In FIG. 10B, the effect of concentration of gold nanoparticle solution is simulated. V1 is set at −1 V and V2 is set at 0 V. U/W=1:4 is set and C value is varied from 1 to 100 mol/m³. The simulation results demonstrate that the focused flow width is not a function of inlet concentration when U/W and V1, V2 remain the same.

In FIG. 10C, the effect of voltage is studied. U/W=1:4 and C=10 mol/m³ are set. V2 is set at 0 V and V1 is varied from −1 V to −100 V. Based on the results, the focused flow width increases as V2 increased.

Results of 3D Printed Features

Figure 11:
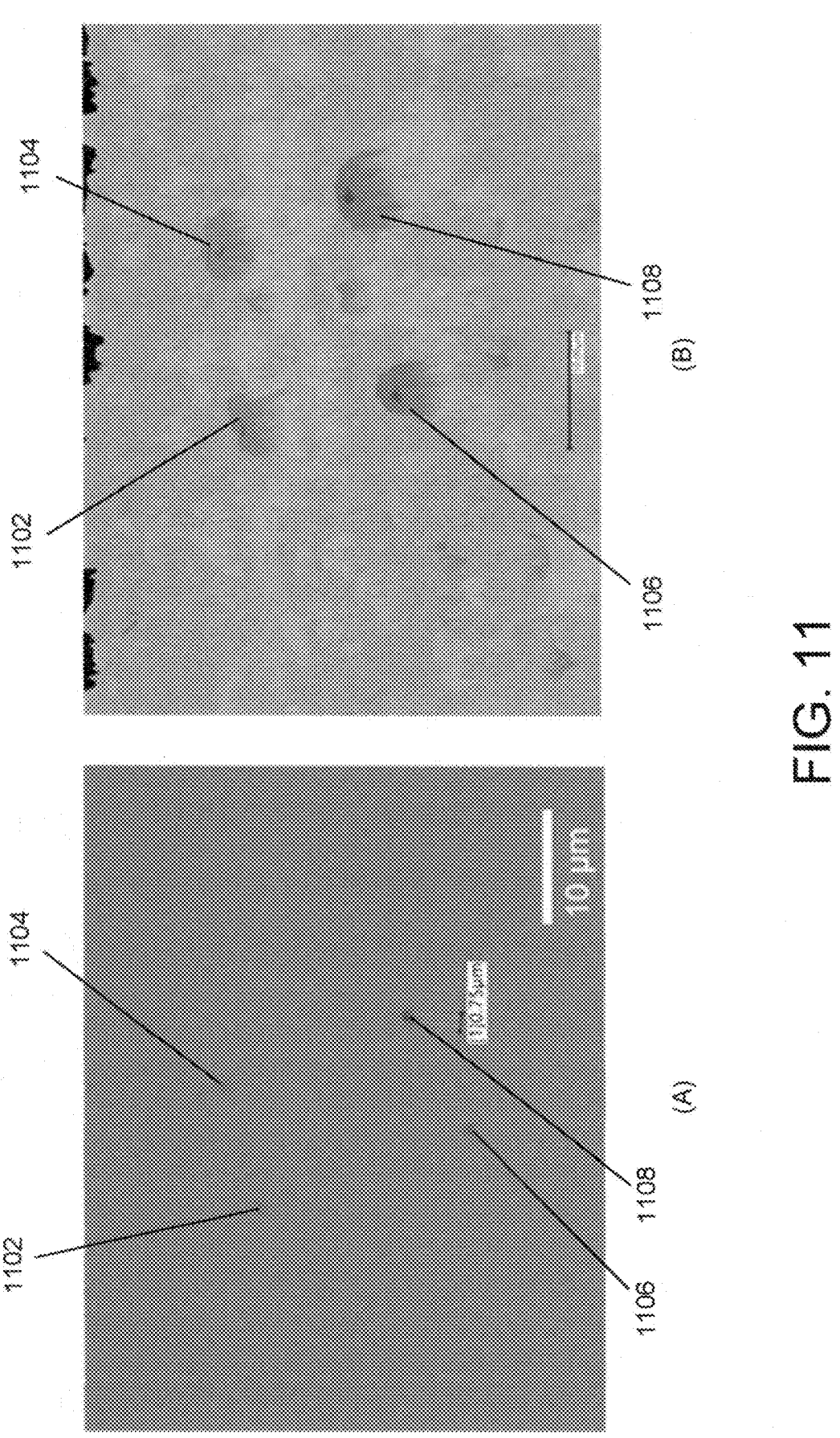
FIG. 11 illustrates an example of (A) a top view and (B) a 3D view of 3D printed pillars.

FIG. 11 illustrates an example of (A) a top view and (B) a 3D view of 3D printed pillars. The pillars are deposited (printed) AuNPs. There are a couple of nano-sprays extruding the ink. One set of the spray produces two pillars. FIG. 11 shows four pillars 1102, 1104, 1106, 1108. The 2D and 3D images shown with nm~μm resolution are obtained using a Keyence VHX digital microscope. To 3D print the micro pillars, 350 V at 200 ms (5 Hz) frequency is used. Four pillars are successfully fabricated on gold coated silicon wafer with ~5 μm tall and 4 μm width.

Figure 12:
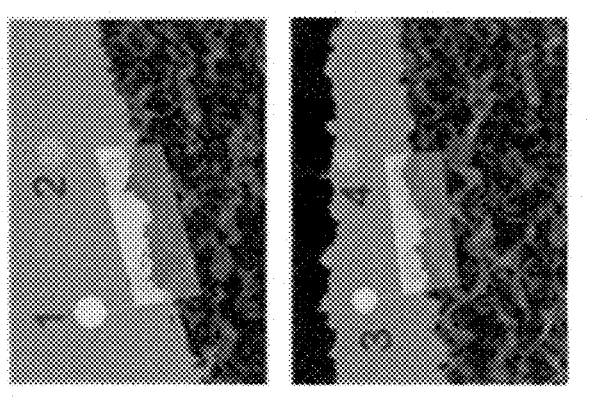
FIG. 12 illustrates an example of the characterization of 3D printed features.
Figure 12:
Figure 12:
Figure 12:
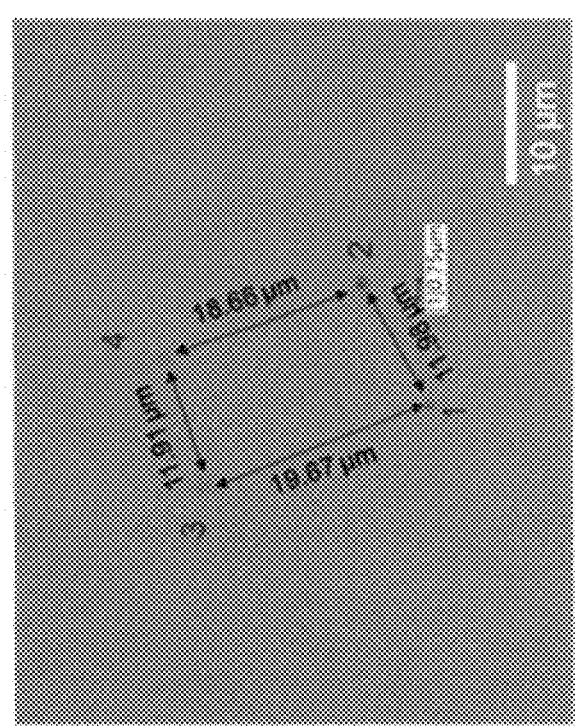

FIG. 12 illustrates an example of the characterization of 3D printed features. It is possible to control the size and aspect ratios of the pillars by varying the distance between the tip of the droplet and substrate. FIG. 12 shows (B) the printed pillars with (A) the distance for micron-sized pillars. The Keyence VHX digital microscope is used to provide 2D and 3D images with nm~μm resolution. As shown in view (A), the height of the printed pillars measures 750 nm.

Figure 13:
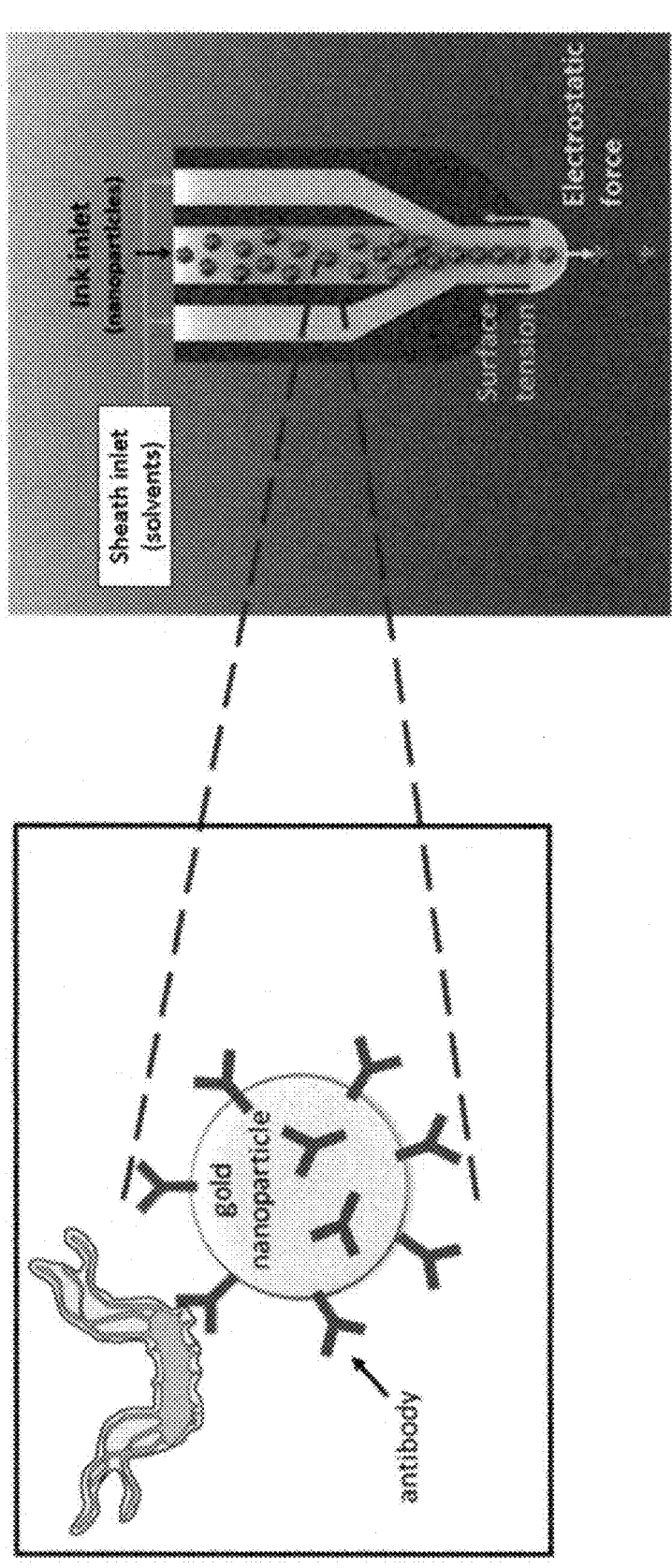
FIG. 13 illustrates an example of bacteria-specific killing on 3D printed nano/micro pillar structures.

FIG. 13 illustrates an example of bacteria-specific killing on 3D printed nano/micro pillar structures. Nano/micro pillars structures with *E. coli*-specific bactericidal activity may be generated using gold nanoparticles conjugated with anti-*E. coli* antibodies as an ink. Another option is to functionalize the printed surface with the antibodies. Specific interaction between bacteria and nanopillars functionalized with antibodies would result in specific bacteria killing on the surface.

Salient Features of 3D Nanoprinting

A simple nozzle fabrication approach has been developed using inexpensive materials. It will increase the production yield, save the fabrication cost, and increase the 3D printed capability with an increased level of control over surface phenomena. The research makes sense of bactericidal mechanisms on nanosurfaces. It has led to the first demonstration of on-demand 3D printing of nanopillars.

The 3D nanoprinting system may include one or more of the following: a specialized nozzle for nanoprinting, gold nanoparticles for ink, and a voltage application at 5 Hz to create nano jet stream. The present research has led to an on-demand, scalable, field-deployable 3D printing technique for concealment, anti-icing, contaminant-free, maintenance-free, and long-lasting materials and surfaces.

The present 3D nanoprinting technique can be applied to optical modulator absorbing and reflecting specific wavelength of lights by changing periodicity, height/size of nanostructures, and to layer-by-layer deposition of materials with different refractive index.

Utilization of EHDP and HFF techniques achieves the nano-sized ink droplets by pinching the printing ink from sheath fluid flow from side channels. The dimension of ink flow can be controlled by adjusting the ink flow rate and the sheath fluid flow rate independently. This nozzle system approaches nanometer dimensions since the droplet diameter will be significantly smaller the nozzle. This 3D nano printing system has the capability to use multiple functional ink materials that have a higher dielectric constant than the surrounding environment from metallic nanoparticles, block copolymers, and to any charged materials.

Heretofore, 3D nanoprinting is only possible using photo-enabled method. The present research has led to the first demonstration of a simple and cost effective extrusion-based 3D nanoprinting method. Ink for the method includes any charged materials. The research has confirmed the printed structures by using Keyence 3D Laser profiler with nanometer resolution and with 0.1% error.

Analysis of the printed structures with respect to time, applied potential, concentration of ink, and positioning is underway. Applications of the printed structures will follow, e.g., the ability to print an anti-microbial surfaces by precise control of the feature dimensions.

Embodiments of the invention can be manifest in the form of methods and apparatuses for practicing those methods. The benefits of implementing this technology include on-demand scalable nano-scale 3D printing system and method to create highly controlled and programmable micro/nanofeatures on surfaces that imbue surfaces with a plethora of novel functionalities.

Unless explicitly stated otherwise, each numerical value and range should be interpreted as being approximate as if the word "about" or "approximately" preceded the value or range.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A 3D printing system comprising:

a substrate;

a first syringe pump and a second syringe pump;

a first syringe coupled to the first syringe pump and a second syringe coupled to the second syringe pump;

a hydrodynamic flow focusing nozzle having a central channel coupled to the first syringe to receive a printing ink and two side channels disposed on two sides of the central channel and coupled to the second syringe to receive a sheath fluid; and a pulse generator to apply an electric potential between the hydrodynamic flow focusing nozzle and the substrate to deposit the printing ink on the substrate on-demand and control ejection frequency of the printing ink from the hydrodynamic flow focusing nozzle;

the first syringe pump being controllable to adjust a printing ink flow rate of the printing ink through the first syringe to the central channel of the hydrodynamic flow focusing nozzle to deposit the printing ink onto the substrate; and the second syringe pump being controllable to adjust a sheath fluid flow rate of the sheath fluid through the second syringe to the two side channels of the hydrodynamic flow focusing nozzle to pinch the printing ink in the central channel using the sheath fluid flowing through the two side channels.

2. The 3D printing system of claim 1, further comprising:

wherein the first syringe pump and the second syringe pump are independently controllable to adjust the sheath fluid flow rate of the sheath fluid independently of the printing ink flow rate of the printing ink, so as to control a dimension of the printing ink flowing from the hydrodynamic flow focusing nozzle to the substrate.

3. The 3D printing system of claim 1, wherein the hydrodynamic flow focusing nozzle comprises a microfluidic nozzle having microfluidic channels having widths of about 40-60 μm.

4. The 3D printing system of claim 1, wherein the hydrodynamic flow focusing nozzle has a printing ink nozzle surface for contacting the printing ink; and wherein the printing ink has a higher dielectric constant than the printing ink nozzle surface.

5. The 3D printing system of claim 4, wherein the printing ink nozzle surface of the hydrodynamic flow focusing nozzle includes a gold coating.

6. The 3D printing system of claim 1, wherein the printing ink comprises at least one of an AuNP solution or gold nanoparticles with controlled sizes in a range of about 3.2-5.2 nm.

7. A 3D printing system comprising:

a substrate;

a first syringe pump and a second syringe pump;

a first syringe coupled to the first syringe pump and a second syringe coupled to the second syringe pump;

a hydrodynamic flow focusing nozzle having a central channel coupled to the first syringe to receive a printing ink and two side channels disposed on two sides of the central channel and coupled to the second syringe to receive a sheath fluid;

a pulse generator to apply an electric potential between the hydrodynamic flow focusing nozzle and the substrate to deposit the printing ink on the substrate on-demand and control ejection frequency of the printing ink from the hydrodynamic flow focusing nozzle;

first means for controlling the first syringe pump to adjust a printing ink flow rate of the printing ink through the first syringe to the central channel of the hydrodynamic flow focusing nozzle to deposit the printing ink onto the substrate; and second means for controlling the second syringe pump to adjust a sheath fluid flow rate of the sheath fluid through the second syringe to the two side channels of the hydrodynamic flow focusing nozzle to pinch the printing ink in the central channel using the sheath fluid flowing through the two side channels.

8. The 3D printing system of claim 7, wherein the second means comprises means for controlling the second syringe pump to adjust the sheath fluid flow rate of the sheath fluid through the second syringe to the two side channels of the hydrodynamic flow focusing nozzle independently of the printing ink flow rate of the printing ink as generated by the first syringe pump, so as to control a dimension of the printing ink flowing from the hydrodynamic flow focusing nozzle to the substrate.

9. The 3D printing system of claim 7, wherein the second means comprises means for controlling the second syringe pump to adjust the sheath fluid flow rate of the sheath fluid flowing through the two side channels to pinch the printing ink in the central channel of the hydrodynamic flow focusing nozzle to a diameter of inner vesicles of less than 10 nm.

10. The 3D printing system of claim 7, wherein the second means comprises means for controlling the second syringe pump to adjust the sheath fluid flow rate of the sheath fluid flowing through the two side channels to pinch the printing ink in the central channel of the hydrodynamic flow focusing nozzle to a diameter of inner vesicles of about 3-7 nm.

11. The 3D printing system of claim 7, wherein the hydrodynamic flow focusing nozzle comprises a microfluidic nozzle having microfluidic channels having widths of about 40-60 μm.

12. The 3D printing system of claim 7, wherein the hydrodynamic flow focusing nozzle has a printing ink nozzle surface for contacting the printing ink; and wherein the printing ink has a higher dielectric constant than the printing ink nozzle surface.

13. The 3D printing system of claim 12, wherein the printing ink nozzle surface of the hydrodynamic flow focusing nozzle includes a gold coating.

14. The 3D printing system of claim 7, wherein the printing ink comprises at least one of an AuNP solution or gold nanoparticles with controlled sizes in a range of about 3.2-5.2 nm.

*   *   *   *   *